United States Patent [19]

Mc Kee et al.

[11] Patent Number: 5,886,105
[45] Date of Patent: Mar. 23, 1999

[54] PREPARATION OF RUBBER-MODIFIED MOLDING MATERIALS FROM REACTION MIXTURES CONTAINING DERIVATIVES OF ACRYLAMIDES OR OF METHACRYLAMIDES

[75] Inventors: Graham Edmund Mc Kee, Neustadt; Hermann Gausepohl, Mutterstadt; Bernhard Rosenau, Neustadt; Walter Heckmann, Weinheim, all of Germany

[73] Assignee: BASF Aktiengesellschaft, Ludwigshafen, Germany

[21] Appl. No.: 836,318

[22] PCT Filed: Nov. 14, 1995

[86] PCT No.: PCT/EP95/04477

§ 371 Date: May 12, 1997

§ 102(e) Date: May 12, 1997

[87] PCT Pub. No.: WO96/15168

PCT Pub. Date: May 23, 1996

[30] Foreign Application Priority Data

Nov. 14, 1994 [DE] Germany .......................... 44 40 673.8

[51] Int. Cl.⁶ .............................. C08L 33/00; C08L 33/26
[52] U.S. Cl. ............................ 525/296; 525/293; 525/80; 525/85
[58] Field of Search .............................. 525/85, 307, 309, 525/80, 296, 293

[56] References Cited

U.S. PATENT DOCUMENTS

| | | | |
|---|---|---|---|
| 3,691,260 | 9/1972 | Mittnacht et al. | 525/75 |
| 3,925,513 | 12/1975 | Schuster et al. | 525/296 |
| 4,224,419 | 9/1980 | Swoboda et al. | 525/71 |
| 4,433,102 | 2/1984 | Brandstetter et al. | 525/75 |
| 4,442,263 | 4/1984 | Brandstetter et al. | 525/83 |
| 4,503,190 | 3/1985 | Fiore et al. | 525/108 |
| 4,634,734 | 1/1987 | Hambrecht et al. | 525/85 |
| 4,788,253 | 11/1988 | Hambrecht et al. | 525/83 |

FOREIGN PATENT DOCUMENTS

| | | |
|---|---|---|
| 2328004 | 5/1977 | France . |
| 1182811 | 2/1962 | Germany . |
| 2940804 | 4/1981 | Germany . |
| 3149046 | 6/1983 | Germany . |
| 3206136 | 9/1983 | Germany . |
| 50053492 | 9/1973 | Japan . |

*Primary Examiner*—Mark L. Warzel
*Attorney, Agent, or Firm*—Keil & Weinkauf

[57] ABSTRACT

In the preparation of a rubber-modified molding material, in a first stage, a first mixture (A) contains at least one alkyl acrylate or methacrylate (a) of the formula (I)

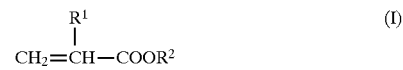

where $R^1$ is hydrogen or methyl and $R^2$ is alkyl of 1 to 32 carbon atoms, a compound (b) of the formula (II)

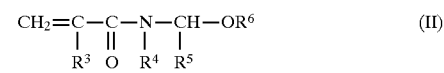

where $R^3$ is hydrogen or methyl, $R^4$ is hydrogen or alkyl of 1 to 8 carbon atoms, $R^5$ is hydrogen or methyl and $R^6$ is hydrogen or alkyl of 1 to 10 carbon atoms, preferably hydrogen, and, if required, a first monomer (c) or a plurality thereof is polymerized with free radicals to give a rubber (B), in a second stage, the resulting rubber (B) is mixed with a second monomer (d) or with a plurality thereof, preferably dissolved or swollen therein, to form a second mixture (C), and in a third stage, the second mixture (C) formed by mixing is polymerized with free radicals to give the rubber-modified molding material (D).

16 Claims, No Drawings

PREPARATION OF RUBBER-MODIFIED MOLDING MATERIALS FROM REACTION MIXTURES CONTAINING DERIVATIVES OF ACRYLAMIDES OR OF METHACRYLAMIDES

The present invention relates to a process for the preparation of rubber-modified molding materials and to rubber-modified molding materials prepared by the process, derivatives of acrylamides or of methacrylamides being used in the process.

Rubber-modified molding materials are materials in which domains of elastomers, for example rubbers, are embedded in a matrix comprising a thermoplastics material. There is a considerable demand for rubber-modified molding materials which have surface gloss, impact strength and tensile strength. The characteristic domain structure is responsible for the desired mechanical properties.

The multiphase character and hence also the domain structure of rubber-modified molding materials is based on the fact that they are composed of different polymer components which are immiscible or only partially miscible with one another. The impact strength thereof results from increased energy absorption during deformation up to fracture. The energy is consumed for the formation of micro-cavities or for initiating sliding processes of the matrix polymer chains. The multiphase character is therefore essential for achieving high impact strengths.

The following are applicable besides:
1. The two chemically different polymer components form a stable dispersion of defined particle size, which neither exhibits phase separation in the thermoplastic melt (processing) nor tends to homogenization with formation of a macromolecular solution at higher temperatures.
2. Coupling must occur between the elastomer particles and the matrix i.e. it must be possible to transmit forces at the phase boundaries.

The most effective phase coupling at the boundaries of the elastomer particles is achieved by graft copolymerization. For example, in the preparation of acrylonitrile/styrene/acrylate/(ASA) molding materials, the procedure generally adopted is one in which an acrylate rubber is initially taken and, by polymerization with a monomer mixture comprising styrene and acrylonitrile, copolymers based on the latter two monomers are then grafted on.

The preparation of ASA molding materials in emulsion is described, for example, in DE 32 06 136, 31 49 046, 31 49 358, 32 27 555, 31 29 378, 31 29 472, 29 40 804, 28 26 925 and 19 11 882. The rubber is prepared in emulsion from n-butyl acrylate and small amounts of monomers containing two double bonds. However, the molding materials prepared by the process do not have impact strength or rigidity and tensile strength sufficient for all applications, and the gloss of the moldings produced therefrom cannot be varied over a wide range.

The emulsion polymerization of styrene/acrylonitrile in the presence of a rubber which contains monomer units comprising derivatives of acrylamides or methacrylamides is described in DE 21 26 151.

For these reasons, the molding materials are most advantageously prepared in solution. Such processes are described in EP 0 095 919 and DE 11 82 811.

According to EP 0 095 919, no grafting of the comonomers onto the rubber, i.e. no effective coupling at the boundary, takes place. According to DE 11 82 811, the rubber is prepared from n-butyl acrylate with 0.5 to 10% by weight of a comonomer having two double bonds capable of radical polymerization. The polymerization of the styrene/acrylonitril (SAN) monomer mixture is initiated at a rubber conversion of from 10 to 80%. Consequently, the grafted part of the rubber does not have the same composition as the polymer matrix, leading to poorer mechanical properties of the molding materials. Furthermore, incorporation of rubber units in the graft shell, i.e. the graft branches, by polymerization leads to a reduction in the Vicat softening temperature of the products.

It is an object of the invention to provide a process for the preparation of rubber-modified molding materials having improved mechanical properties, in particular higher impact strength, notched impact strength and hole impact strength.

We found that the subject is achieved by the novel process in which, in a first stage, a first mixture (A) which contains at least one alkyl acrylate or methacrylate (a) of the general formula (I)

where $R^1$ is hydrogen or methyl and $R^2$ is alkyl of 1 to 32 carbon atoms, a compound (b) of the general formula (II)

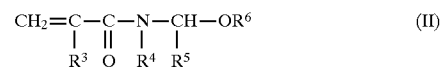

where $R^3$ is hydrogen or methyl, $R^4$ is hydrogen or alkyl of 1 to 8 carbon atoms, $R^5$ is hydrogen or methyl and $R^6$ is hydrogen or alkyl of 1 to 10 carbon atoms, and, if required, a first monomer (c) or a plurality thereof is polymerized with free radicals, preferably in solution, to give a rubber (B),
in a second stage, the resulting rubber (B) is mixed with a third monomer (c) or with a plurality thereof, preferably dissolved or swollen therein, to form a second mixture (C), and
in a third stage, the second mixture (C) formed by mixing is polymerized with free radicals to give the rubber-modified molding material (D).

If necessary, a solvent may also be added in the second stage.

The preparation of an improved rubber-modified molding material by the novel process is based on the fact that, in the first stage, the acrylate or methacrylate is copolymerized with an acrylamide or methacrylamide of the general formula (II). In the course of the copolymerization, crosslinking takes place and causes the rubber molecules to be bonded via the following structure (III):

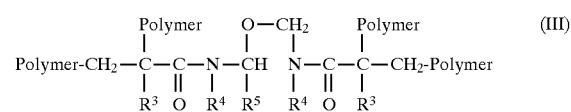

where $R^3$, $R^4$ and $R^5$ have the same meanings as above.

Graft copolymerization takes place in the third stage, the backbone of the resulting graft copolymer being formed by the rubber (B) and the grafts being composed of the third monomer (d). Because 100% grafting does not occur, some of the rubber remains ungrafted and a chain polymer is simultaneously formed from the third monomer (d), so that three types of molecules are present in the molding material, ie. molecules of rubber (B), of the polymer of (d) and of the rubber (B) grafted with (d).

Examples of alkyl of 1 to 32 carbon atoms are methyl, ethyl, n-propyl, isopropyl, n-butyl, isobutyl, tert-butyl, n-pentyl, isopentyl, n-hexyl, n-heptyl, n-octyl, ethylhexyl, n-nonyl, n-decyl, n-dodecyl, n-tetradecyl, n-hexadecyl, n-octadecyl, n-eicosyl, n-docosyl, n-tetracosyl, n-hexacosyl, n-octacosyl, n-triacontyl, n-hentriacontyl and dotriacontyl.

Examples of carboxylates of 1 to 10 carbon atoms are formyl, acetyl, n-propionyl, isopropionyl, n-butanoyl, isobutanoyl, tert-butanoyl, n-pentanoyl, n-hexanoyl, n-heptanoyl, n-octanoyl, n-nonanoyl and n-decanoyl.

In a preferred embodiment of the invention, $R^2$ is alkyl of 1 to 18 carbon atoms.

In a further preferred embodiment of the invention, the mixture (A) has the following composition:

from 35 to 99.8% by weight of the alkyl acrylate or methacrylate (a), from 0.2 to 5% by weight of the compound (b) and from 0 to 60% by weight of the first monomer (c), preferably from 36 to 99.9% by weight of (a), from 0.1 to 4% by weight of (b), and from 0 to 60% by weight of (c), all data in % by weight being based on the total amount of the mixture (A).

The rubber (B) preferably has a glass transition temperature of less than 0° C., preferably less than −10° C., the glass transition temperature being determined by means of DSC according to ASTM 3418. The rubber thus has the required softness. The glass transition temperature can be established either by using an acrylate or methacrylate whose polymer has the desired glass transition temperature or by using a mixture of acrylates of methacrylates which have different lengths of the side chains ($R^2$ in formula I). This adjustment of the glass transition temperature is based on the fact that the glass transition temperature of acrylate and methacrylate polymers initially decreases with increasing length of the side chain, then passes through a minimum and finally increases again. The minimum occurs at a side chain of about 7 carbon atoms for polyacrylates and at a side chain of 10 carbon atoms for polymethacrylates. This general range for the length of the side chains $R^2$ is therefore preferred. The rubber-modified molding material (D) prepared contains from 1 to 60, preferably from 5 to 40, % by weight of the rubber (B). The upper limit is determined by the fact that the molding material must have sufficient strength in spite of the embedded domains of the rubber. The lower limit is determined essentially by the fact that sufficient energy must be absorbed during deformation.

In a further preferred embodiment of the invention, n-butyl acrylate or ethylhexyl acrylate is used as the alkyl acrylate or methacrylate (a).

Examples of compounds (b) of the formula (II) are N-alkylolacrylamide and N-alkylolmethacrylamide compounds, such as methylolacrylamidemethyl ether, N-methylolacrylamide, methylolmethacrylamide methyl ether, N-methylolmethacrylamide, N-methylolmethacrylamide butyl ether and N-methylolmethacrylamide acetate.

Examples of first monomers (c) are compounds having two double bonds, such as divinylbenzene, allyl methacrylate and butanediol diacrylate, compounds having only one double bond, such as substituted or unsubstituted styrene, ethylene and methacrylic acid derivatives, such as methacrylamide, and compounds which contain groups which form free radicals on thermal decomposition, ie. compounds having peroxy groups, diazo groups or labile C—C bonds.

Examples of second monomers (d) are styrene, α-methylstyrene, styrenes substituted in the nucleus and having halogen and/or aliphatic hydrocarbon groups, acrylonitrile, methyl methacrylate, maleic anhydride and N-vinylmaleimide, preferably styrene of the formula

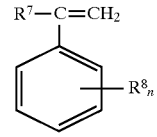

where $R^7$ and $R^8$, which may be identical or different, are each hydrogen or alkyl of 1 to 8 carbon atoms and n is from 0 to 4, and acrylonitrile. Accordingly, in particular ASA molding materials are prepared by the novel process.

In the third stage of the novel process, the polymerization can be either carried out continuously as a solution or mass polymerization or continued as a suspension polymerization after conversion of at least 15%.

The polymerization is carried out from 0° to 200° C., preferably from 50° to 160° C. All conventional polymerization processes may be used, but free radical polymerization is preferred.

The mixtures may contain additives such as lubricants, antioxidants, colorants, glass fibers and/or fillers.

In the molding material, the rubbers are present as particles having a diameter of from 0.1 to 20 μm, preferably from 0.1 to 10 μm, in the polymer matrix. Bimodal or trimodal distributions are preferred. The rubber particles are in the form of capsules, rods, drops, labyrinths, cells, coils, shells, rod clusters or drop clusters. However, particles which consist of a plurality of spherical particles are also observed. Cells or the last-mentioned type are preferred. The stated particle forms are described in A. Echte, Advances in Chemical Serials, 222 (1989), p 29.

The rubbers can be used to prepare blends with other plastics, which blends contain up to 65% by weight of these plastics. Examples of suitable plastics are polycarbonates, polyphenylene ethers, polymethyl methacrylate, polyesters and polyamides.

The invention is described in detail below with reference to particularly preferred embodiments.

EXAMPLE

In the examples, the following compounds are used: cyclohexane, n-butylacrylate, N-methylolmethacrylamide (M-AMOL), acrylonitrile and styrene are products from BASF and are used without further purification.

Luviskol® K 90 is also a product from BASF and is a polyvinylpyrolidone having a K value of 90, measured in 1% strength solution in water at 25° C. The measurement of the K value is described in cellulose Chemie, 13 (1932), p. 358–364.

Allyl methacrylate was obtained from Fluka, tetra sodium diphosphate from Merck, azobisisobutyronitrile from Akzo Chemicals and dicumyl peroxide from Peroxid Chemie.

The stabilizer used was octadecyl 3-(3,5-di-tert-butyl-4-hydroxyphenyl)propionate, a phenolic antioxidant which is sold under the name Irganox® 1076 by Ciba Geigy.

Experiment 1 (comparison)

397 g of n-butylacrylate 750 g of cyclohexane and 545 mg of 2,2'-azobisisobutyronitrile were introduced into a flask and heated to 75° C. under nitrogen and with stirring. After an initiation time of 5 minutes, a mixture of 4.68 g of allyl methacrylate and 103 g of n-butyl acrylate was metered in over 4 hours. After the end of the addition, 0.12% by weight, based on the total batch, of Irganox 1076 was added and the mixture was then cooled.

Cyclohexane was removed in a rotary evaporator under reduced pressure and was replaced with styrene, after which acrylonitrile was added to produce a mixture of 69.2% by weight of styrene, 23% by weight of acrylonitrile and 7.8% by weight of rubber.

After the addition of 0.075% by weight of benzoyl peroxide, 0.07% by weight of tert-dodecyl mercaptan and 0.12% by weight of Irganox 1076, all data being based on the total weight of the solution, the solution was introduced into a 5 l kettle and heated to 86° C. under nitrogen and with stirring. At a conversion of about 40%, one part, based on one part of polymer solution, of an aqueous solution of 1% of Luviskol K 90, 0.1% of tetrasodium diphosphate and 0.1% of dicumyl peroxide was added. Polymerization of the batch was completed as follows:

for 3 hours at 100° C.
for 3 hours at 130° C.
for 6 hours at 140° C.

The mixture was then cooled and the polymer was filtered off and dried.

Experiments 2 and 3 (according to the invention)

Experiment 1 was repeated, 0.5% by weight (experiment 2) or 1.0% by weight (experiment 3) of N-methylolmethacrylamide having been incorporated into the rubber by polymerization. The N-methylolmethacrylamide was added to the feed of the mixture of n-butyl acrylate and allyl methacrylate.

The molding materials obtained in experiments 1 to 3 were injection molded at a melt temperature of 240° C. and a mold temperature of 60° C. to give standard small bars. The impact strength according to DIN 53453-n, 5/75 edition, the notched impact strength according to DIN 53453-k, 5/75 edition, and the hole impact strength according to DIN 53753-L-3-0, 4/81 edition, were measured for these moldings.

The results are shown in Table 1 below:

TABLE 1

| | Mechanical properties of the molding materials | | | |
|---|---|---|---|---|
| Experiment | % M-AMOL in the rubber | AN1 kJ/m² at 23° C. | AK² kj/m² at 23° C. | AKL³ kj/m² at 23° C. |
| 1 (comparison) | 0 | 16 | 1.7 | 6.2 |
| 2 (according to the invention) | 0.5 | 21 | 3.7 | 7.8 |
| 3 (according to the invention) | 1.0 | 28 | — | 8.9 |

1: Impact strength
2: Notched impact strength
3: Hole impact strength

It is evident that the addition of N-methylolmethacrylamide results in an improvement in the mechanical properties of the molding materials.

We claim:

1. A process for the preparation of a rubber-modified molding material, wherein in a first stage, a first mixture (A) which contains
   i) at least one alkyl acrylate or methacrylate (a) of the formula (I)

where $R_1$ is hydrogen or methyl and $R^2$ is alkyl of 1 to 32 carbon atoms,
   a compound (b) of the formula (II)

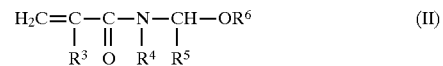

where $R^3$ is hydrogen or methyl, $R^4$ is hydrogen or alkyl of 1 to 8 carbon atoms, $R^5$ is hydrogen or methyl and $R^6$ is hydrogen or alkyl of 1 to 10 carbon atoms, and,
   iii) if required, a first monomer (c) or a plurality thereof is polymerized with free radicals to give a rubber (B),
in a second stage, the rubber (B) is dissolved or swollen in a second monomer (d) or in a plurality thereof to form a second mixture (C), and
in a third stage, the second mixture (C) is polymerized with free radicals to give the rubber-modified molding material (D).

2. The process defined in claim 1, wherein $R^2$ is alkyl of 1 to 18 carbon atoms.

3. The process defined in claim 1, wherein the mixture (A) has the following composition:
   i) from 30 to 99.8% by weight of the alkyl acrylate or methacrylate (a),
   ii) from 0.2 to 10% by weight of the compound (b), and
   iii) from 0 to 60% by weight of the first monomer (c),
all data in % by weight being based on the total amount of the mixture (A).

4. The process defined in claim 1, wherein a rubber-modified molding material (D) which contains from 1 to 60% by weight of the rubber (B) is prepared.

5. The process defined in claim 1, wherein the alkyl acrylate or methacrylate (a) is butyl acrylate or ethylhexyl acrylate.

6. The process defined in claim 1, wherein $R^3$ is hydrogen or methyl, $R^4$ is hydrogen, $R^5$ is hydrogen and $R^6$ is hydrogen or alkyl of 1 to 10 carbon atoms.

7. The process defined in claim 1, wherein the second monomer (d) is styrene, acrylonitrile, methacrylamide, maleic anhydride or N-phenylmaleimide.

8. The process defined in claim 1, wherein the first monomer (c) contains two or more polymerizable double bonds.

9. The process defined in claim 1, wherein a further monomer (c) contains groups which form free radicals on thermal decomposition.

10. The process defined in claim 1, wherein the polymerization of the mixture (C) is continued as a suspension polymerization after conversion of at least 15%.

11. A rubber-modified material, which is prepared according to the process of claim 1 and which contains particles of the rubber (B) which are embedded in a matrix.

12. The rubber-modified molding material defined in claim 11, wherein the rubber particles are in the form of capsules, rods, drops, labyrinths, cells, coils, shells, rod clusters or drop clusters.

13. The rubber-modified molding material defined in claim 11, wherein the rubber particles have a diameter of from 0.1 to 20 μm.

14. The process defined in claim 1, wherein a rubber-modified molding material (D) which contains from 5 to 40% by weight of the rubber (B) is prepared.

15. The process defined in claim 1, wherein $R^6$ is hydrogen or alkyl of 1 to 6 carbon atoms.

16. The process defined in claim 1, wherein $R^6$ is hydrogen.

* * * * *

UNITED STATES PATENT AND TRADEMARK OFFICE
CERTIFICATE OF CORRECTION

PATENT NO.: 5,886,105

DATED: March 23, 1999

INVENTOR(S): McKEE et al.

It is certified that error appears in the above-identified patent and that said Letters Patent is hereby corrected as shown below:

Col. 6, claim 1, the line above formula (II), insert --ii)-- before "a compound".

Signed and Sealed this

Twentieth Day of July, 1999

Attest:

Attesting Officer

Q. TODD DICKINSON

Acting Commissioner of Patents and Trademarks